United States Patent
Piper

(10) Patent No.: US 10,809,383 B2
(45) Date of Patent: Oct. 20, 2020

(54) METHOD OF SPATIAL SIGNAL SEPARATION FOR SATELLITE NAVIGATION SYSTEMS

(71) Applicant: John Elton Piper, Panama City Beach, FL (US)

(72) Inventor: John Elton Piper, Panama City Beach, FL (US)

(73) Assignee: John E Piper, Panama City Beach, FL (US)

( * ) Notice: Subject to any disclaimer, the term of this patent is extended or adjusted under 35 U.S.C. 154(b) by 60 days.

(21) Appl. No.: 16/296,146

(22) Filed: Mar. 7, 2019

(65) Prior Publication Data
US 2020/0284916 A1    Sep. 10, 2020

(51) Int. Cl.
  *G01S 19/21*    (2010.01)
  *G06F 17/16*    (2006.01)
  *H01Q 3/26*    (2006.01)

(52) U.S. Cl.
  CPC ............ *G01S 19/215* (2013.01); *G06F 17/16* (2013.01); *H01Q 3/2682* (2013.01)

(58) Field of Classification Search
  CPC ........ G01S 19/215; G01S 19/20; G01S 19/43; G06F 17/16; H01Q 3/2682
  See application file for complete search history.

(56) References Cited

U.S. PATENT DOCUMENTS

| | | | |
|---|---|---|---|
| 9,559,417 B1* | 1/2017 | Schwarzwalder ... | H04B 7/0617 |
| 2009/0073039 A1* | 3/2009 | Rideout ................... | G01S 5/06 342/357.31 |
| 2009/0273511 A1* | 11/2009 | Schroth .................. | G01S 19/20 342/357.48 |
| 2013/0002479 A1* | 1/2013 | Pratt ....................... | G01S 19/43 342/357.25 |

* cited by examiner

*Primary Examiner* — Albert K Wong

(57) ABSTRACT

In a multiple signal environment, it is important to be able to separate signals. Complete spatial separation can only be accomplished by following the proper mathematical method. This involves first modeling multiple signals that map onto an antenna array. Inverting this process by use of the Moore-Penrose inverse results in spatially separating the signals of interest. This method has important applications in satellite navigation systems where it is relatively easy to jam or spoof the valid but weak navigation signals coming from satellites in high orbits.

3 Claims, 2 Drawing Sheets

METHOD OF SPATIAL SIGNAL SEPARATION FOR SATELLITE NAVIGATION SYSTEMS

BACKGROUND OF THE INVENTION

Spatial signal separation is an important and long-studied problem. Methods used are typically called beamforming. The essence of beamforming or spatial signal processing is to focus the beam in the desired direction while rejecting signals from other directions. Books have been written on this subject, and it is still an active area of research interest.

Popular examples used in many systems are null beam steering, controlled radiation pattern antenna (CRPA), and sidelobe cancellation. However, these conventional array processing techniques, which require placing a null in the direction of unwanted interference, are limited. Limited or suboptimal because the mathematics of conventional array processing implicitly and incorrectly assumes a one-signal model in a multiple-signal environment. This allows unwanted leakage from other signals.

The method in this invention differs by using a multiple signal model in its mathematical construct to map the signals onto an antenna array. The solution to untangling these signals from the antenna array data requires the multiple signal model to be inverted using the Moore-Penrose inverse. This effectively leads to complete separation or decoupling of the signals of interest and the interfering signals—even when the interfering signals are very much stronger. This method has important applications for satellite navigation systems.

The Global Position System (GPS) is widely used for navigation. Other countries have similar satellite navigation systems. The GPS system was originally designed for use by the military where it is critically important to know your location and your target's location. Civilian use of GPS has been allowed and is now a common method for aviation and terrestrial and marine navigation. GPS time is also important in cell phone timing and financial institution transactions.

GPS signals are transmitted from a constellation of United States Air Force space vehicles (SV) located in high orbits. Generally, at least 6 SVs are visible from the earth at any given time. The GPS signals are very weak at the receiving antenna. Typically, these signals are amplified, filtered, down shifted in frequency, and digitized before being sent to a GPS receiver where they are decoded. By timing the signal delays to the known SV position, it is possible to accurately estimate the position of the GPS receiver.

A problem with satellite navigation signals is that they are low power signals transmitted from high orbits. This vulnerability allows the signals to be easily interfered or jammed or spoofed from nearby transmitters which produce strong signals at the GPS frequencies. This is a very significant and a very real problem. The problem is described in Michael Jones, *The Civilian Battlefield: Protecting GNSS Receivers from Interference and Jamming*, Inside GNSS, March/April 2011.

Many publications and patents attempt to address these problems. The majority of these attempts use spatial separation methods that place a null in the array beampattern in the direction of the interference by introducing time delays or phase shifts or complex weights for different antenna inputs to produce the desired result.

An important part of all methods that attempt to spatially separate signals is to accurately know the direction of arrival of the various signals. This has been a long-studied problem and many techniques have been developed to accurately estimate the direction of arrival of signals. An example is described in I. Ziskind and M. Wax, *Maximum Likelihood Localization of Multiple Sources by Alternating Projection*, IEEE Transactions on Acoustics, Speech, and Signal Processing, October 1988.

The direction of arrival of the valid satellite signals is particularly simple, since the orbital data is well known from the broadcast almanac which accurately predicts SV locations up to six months in advance. The direction of arrival of jamming or spoofing signals is intentionally strong which makes it easy through a variety of techniques to accurately estimate their direction of arrivals.

BRIEF SUMMARY OF THE INVENTION

The utility of this method is the complete spatial separation of multiple valid satellite and interference signals. The novelty of this method is the use of the Moore-Penrose inverse to effectively untangle the signals. Specifically, this method uses the navigation signals measured from the antenna array and maps them onto a signal space in which the signals are completely decoupled. This approach is both mathematically elegant and powerful. FIG. 1 describes the general approach.

This method constructs a mathematical model that explicitly assumes N signals, s(t), are received by an array of M antennas. This mapping can be mathematically represented by the following equation:

$$\begin{pmatrix} a_1(t) \\ a_2(t) \\ a_3(t) \\ \vdots \\ a_M(t) \end{pmatrix} = \begin{pmatrix} 1 & 1 & 1 & \ldots & 1 \\ \Delta_{12} & \Delta_{22} & \Delta_{32} & & \Delta_{N2} \\ \Delta_{13} & \Delta_{23} & \Delta_{33} & & \Delta_{N3} \\ \vdots & \vdots & \vdots & & \vdots \\ \Delta_{1M} & \Delta_{2M} & \Delta_{3M} & \ldots & \Delta_{NM} \end{pmatrix} \begin{pmatrix} s_1(t) \\ s_2(t) \\ s_3(t) \\ \vdots \\ s_N(t) \end{pmatrix}$$

Where,
$s_j(t) = j^{th}$ signal
$a_k(t) = k^{th}$ antenna output
$\Delta_{jk} =$ mapping (delay) of $j^{th}$ signal onto $k^{th}$ antenna Inspection of the above equation shows that every antenna will receive all the signals at various delays. To correctly separate this tangle of signals it is necessary to invert the above equation. The Moore-Penrose inverse performs the inversion in a least-squares sense.

It is convenient to call the signal vector, S, the antenna vector, A, and the mapping or delay or steering matrix, D. the above equation can then be compactly written as:

$$A = DS$$

The Moore-Penrose then requires the above equation be left multiplied by $D^\dagger$, the Hermitian (complex conjugate transpose) of D.

$$D^\dagger A = D^\dagger DS$$

This equation is then left multiply by $(D^\dagger D)^{-1}$ which yields the signal vector from the measured antenna outputs.

$$S = (D^\dagger D)^{-1} D^\dagger A$$

It is important to note that in this representation all of the signals are effectively in their own dimensional space and are completely decoupled from other signals. Traditional array processing is based on simply steering the array towards the direction of interest, which is what the $D^\dagger A$ term does. This method additionally includes the $(D^\dagger D)^{-1}$ term which mathematically separates the signals and can be thought of as an inner product metric. In practical terms it can be thought of as a two-dimensional matrix of amplitudes and phase shifts or delays that are applied to the $D^\dagger A$ vector. So, in that context this method can be thought of as an extension of traditional methods.

According to this invention, conventional beamforming methods, which typically are based on mathematical methods that implicitly assume a one-signal source, can be replaced by a beamformer that assumes multiple-signal inputs and outputs multiple signals arriving from different directions. These spatially separated signals are mathematically decoupled from each other.

Therefore, it is an object of the present invention to provide a capability for GPS and GPS-like systems to enhance the satellite signals while eliminating unwanted signals that interfere, jam, or attempt to spoof.

These advantages and objects of the present invention will become apparent from the following detailed description.

DETAILED DESCRIPTION OF THE INVENTION

The present invention provides for a method to spatially separate multiple signals that are important for navigation systems in environments with unavoidable multiple signals. Complete separation of these signals requires a novel method that is not taught in textbooks but introduced and explained here.

The approach used in this method uses the Moore-Penrose inverse to spatially decouple all of the signals into orthogonal signal spaces. These include both the valid SV signals and any other signals at that frequency coming from other directions. The Moore-Penrose inverse is effectively a matrix of complex weights for the antenna inputs which form independent beams to recover the signals in the various directions. In this application it can be thought of as the Moore-Penrose beamformer.

Figure 1:
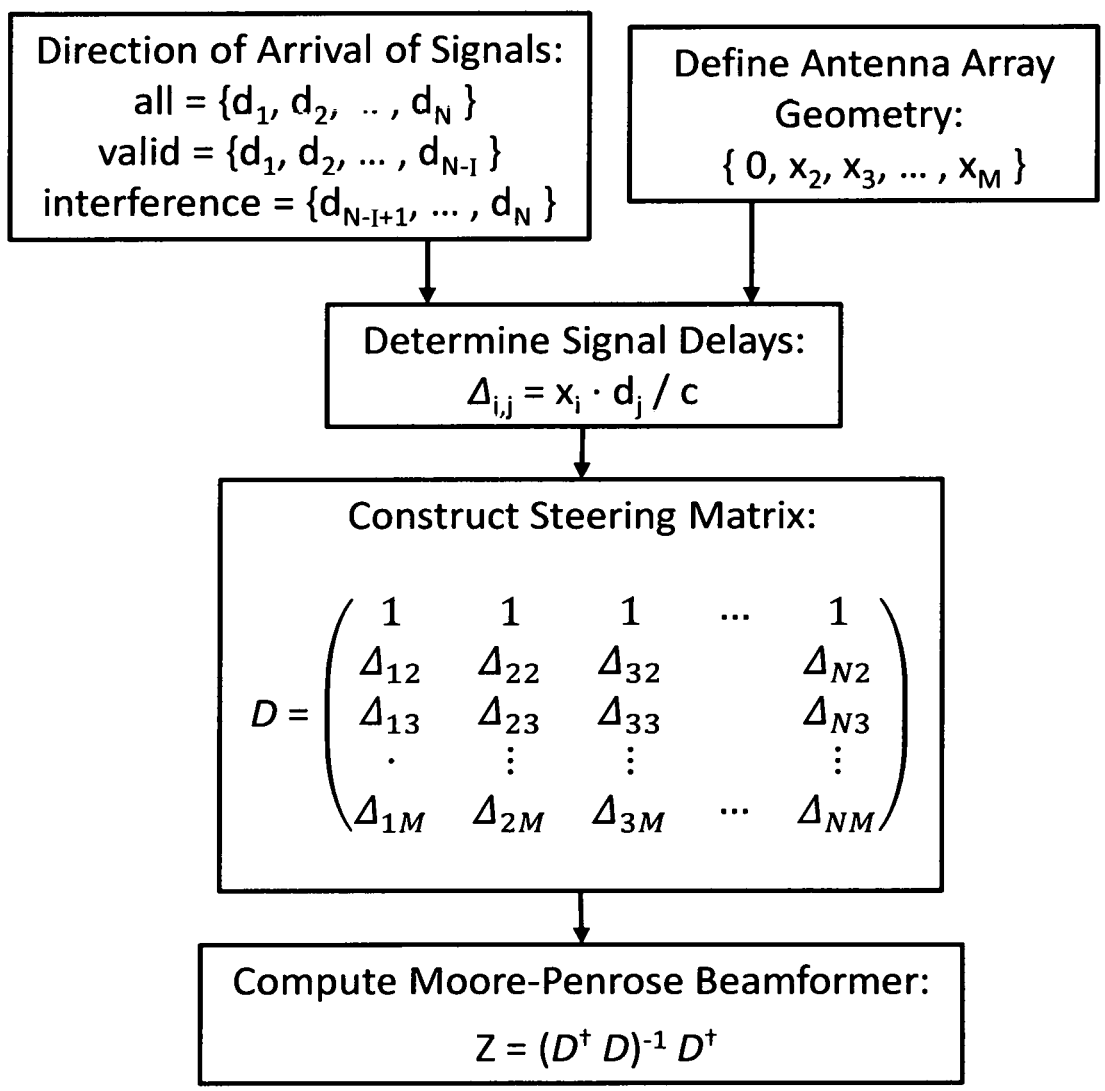
FIG. 1. Construction of Moore-Penrose beamformer from direction-of-arrival and array geometry information.
Figure 2:
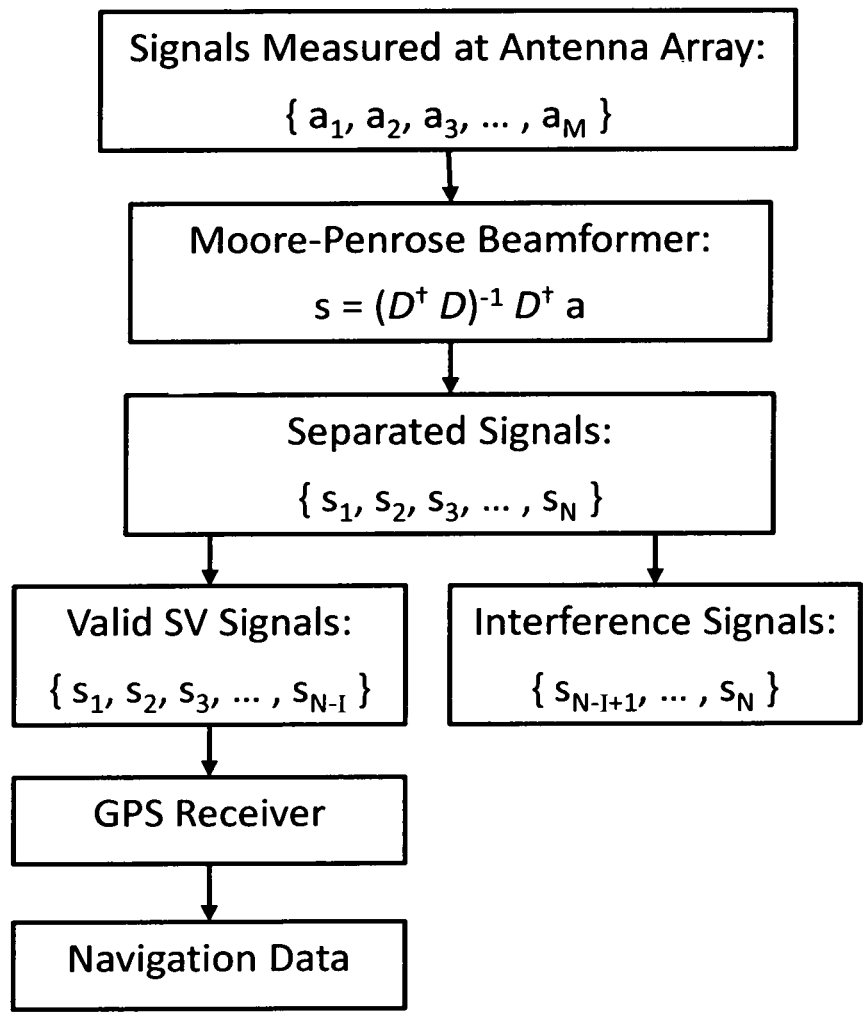
FIG. 2. Spatial signal separation example for GPS navigation.

The method is described in FIG. 2. The direction of arrival of the multiple signals are assumed to be known. The positions of the SVs are very accurately known through broadcasts of their almanac and ephemeris. The interfering signals directions of arrival can be determined through a number of techniques. Fortunately, the stronger the interfering signal is the more accurately its direction can be determined. In some cases, the direction of the interference may be known a priori.

For N signals of interest, the direction-of-arrival unit vectors, $\{d_1, d_2, \ldots, d_N\}$, can be divided into N−I valid GPS signals, $\{d_1, d_2, \ldots, d_{N-I}\}$, and I interference signals, $\{d_{N-I+1}, \ldots, d_N\}$. It should be noted that the valid GPS signals can also include augmented ground-based signals such as DGPS and aircraft landing systems.

For M antennas in the array, it is convenient to refer to the first antenna as the origin. The geometry of the array can then be specified as $\{0, x_2, x_3, \ldots, x_M\}$ where the x vectors indicate the direction and distance from the origin.

Each antenna receives information from all the signals. Multiple antennas form an array. Arrays are useful since they increase the information content which leads to better signal-to-noise ratios and through the use of forming directional beams. It has been shown that the maximum number of resolvable signals by an array is M, the number of antennas. This is an important consideration for the system designer.

The time delay, $\Delta_{i,j}$, associated with the $j^{th}$ signal onto the $i^{th}$ antenna is simply the dot product of the signal unit direction vector, $d_j$, and the antenna geometry vector, $x_i$, divided by the speed of light:

$$\Delta_{i,j} = x_i \cdot d_j / c$$

These time delays are used to construct the steering matrix:

$$D = \begin{pmatrix} 1 & 1 & 1 & \ldots & 1 \\ \Delta_{12} & \Delta_{22} & \Delta_{32} & & \Delta_{N2} \\ \Delta_{13} & \Delta_{23} & \Delta_{33} & & \Delta_{N3} \\ \vdots & \vdots & \vdots & & \vdots \\ \Delta_{1M} & \Delta_{2M} & \Delta_{3M} & \ldots & \Delta_{NM} \end{pmatrix}$$

The Moore-Penrose inverse, z, can men De constructed from the steering matrix:

$$Z = (D^\dagger D)^{-1} D^\dagger$$

Separating the signals from the antenna array data is the job of the Moore-Penrose inverse. Mathematically, the vector of the individual signals, s, is obtained by multiplying the Moore-Penrose inverse matrix, Z, and the vector of the individual antenna outputs, a.

$$\begin{pmatrix} s_1(t) \\ s_2(t) \\ s_3(t) \\ \vdots \\ s_N(t) \end{pmatrix} = Z \begin{pmatrix} a_1(t) \\ a_2(t) \\ a_3(t) \\ \vdots \\ a_M(t) \end{pmatrix}$$

Thus, the first signal stream is simply the complex weights of the first row of the Moore-Penrose inverse matrix times the outputs of the antenna array vector. The second signal stream is simply the complex weights of the second row of the Moore-Penrose inverse matrix times the outputs of the antenna array vector. The third signal stream is simply the complex weights of the third row of the Moore-Penrose inverse matrix times the outputs of the antenna array vector. And so forth until all the valid GPS signals are calculated. These multiply and add operations can be easily performed using dedicated digital signal processing chips.

The above method assumes the signals are narrowband and the time delays can be approximated using phase shifts. Alternatively, it is possible to use the time shifts in the separation of the signals.

The valid GPS signals are then fed into the GPS receiver which calculates the navigation data. Since the GPS signals are already spatially separated, the normal GPS receiver function of separating the signals based on near-orthogonal gold codes is not required. By skipping this function, it is possible to save a lot of calculations and thereby acquire a navigation solution faster.

Although the present invention has been described with reference to preferred embodiments, workers skilled in the art will recognize that changes may be made in form and detail without departing from the spirit and scope of the invention. For example, references herein to the GPS are also intended to include non-GPS satellite and or terrestrial navigation signals.

The invention claimed is:

1. A method of spatially separating GPS signals and interference signals using an antenna array, said method comprising:
   receiving GPS signals and interference signals from the antenna array to generate antenna array data ($a_m$);
   determining signal time delays on the antenna array from direction-of-arrival vectors of satellites and the array geometry vectors of the antenna array;
   constructing a steering matrix (D) from the signal time delays;
   computing a Moore-Penrose inverse (Z) from the steering matrix according to $$Z = (D^\dagger D)^{-1} D^\dagger$$

wherein $D^\dagger$ is the Hermitian of D;
   separating signals ($s_n$) into the GPS signals and the interference signals by multiplying a Moore-Penrose inverse with the antenna array data ($a_m$) according to $$\begin{pmatrix} s_1(t) \\ s_2(t) \\ s_3(t) \\ \vdots \\ s_N(t) \end{pmatrix} = Z \begin{pmatrix} a_1(t) \\ a_2(t) \\ a_3(t) \\ \vdots \\ a_M(t) \end{pmatrix}$$

and finding valid satellite navigation signals from the set of separated signals by matching a signal number to a valid satellite direction of arrival.

2. The method of claim 1, further comprising the step of inputting the valid satellite navigation signals into a GPS receiver and outputting a current location.

3. A GPS navigation device, comprising:
   an antenna array for receiving GPS and interference signals and generating antenna array data;
   a processor for performing the calculating, constructing, computing and separating steps recited in claim 1 from the antenna array data; and
   a GPS receiver to receive the GPS signals and to provide an indication of a location based on the GPS signals.

* * * * *